United States Patent [19]

Zornig

[11] 4,103,825
[45] Aug. 1, 1978

[54] SOLAR HEATED AND COOLED DWELLING

[75] Inventor: Harold F. Zornig, Pendleton, S.C.

[73] Assignee: The United States of America as represented by the Secretary of Agriculture, Washington, D.C.

[21] Appl. No.: 798,723

[22] Filed: May 19, 1977

[51] Int. Cl.² ............................................. F27J 3/02
[52] U.S. Cl. .................... 237/1 A; 126/270; 126/400; 98/33 R
[58] Field of Search .............. 126/270, 271, 400; 237/1 A; 98/33 R, 33 A, 42 A, DIG. 6, 31; 165/48

[56] References Cited

U.S. PATENT DOCUMENTS

| 2,118,949 | 5/1938 | Scott | 98/33 A |
|---|---|---|---|
| 2,127,095 | 8/1938 | Strong | 98/33 A |
| 2,306,034 | 12/1942 | Bernhardt | 98/33 A |
| 2,559,869 | 7/1951 | Gay | 126/270 |
| 2,680,565 | 6/1954 | Löf | 126/271 |
| 3,027,090 | 3/1962 | Zerham, Jr. | 98/DIG. 6 |
| 3,254,703 | 6/1966 | Thomason | 165/48 |
| 3,412,728 | 11/1968 | Thomason | 126/270 |
| 3,902,474 | 9/1975 | Pyle | 126/270 |
| 3,955,555 | 5/1976 | Bostrom | 126/270 |
| 3,994,276 | 11/1976 | Pulver | 237/1 A |
| 4,006,856 | 2/1977 | Nilsson | 237/1 A |
| 4,020,989 | 5/1977 | Kantz | 126/270 |
| 4,029,258 | 6/1977 | Groth | 237/1 A |
| 4,049,195 | 9/1977 | Rugenstein | 126/270 |
| 4,051,891 | 10/1977 | Harrison | 237/1 A |
| 4,051,999 | 10/1977 | Granger et al. | 126/270 |

Primary Examiner—John J. Camby
Assistant Examiner—Henry C. Yuen
Attorney, Agent, or Firm—M. Howard Silverstein; David G. McConnell

[57] ABSTRACT

Solar heated or cooled dwelling in which attic is divided into upper and lower interconnected plenums. Air is heated in upper plenum by solar radiation, and is conveyed to rooms of dwelling, while cooler air is returned to upper plenum from rooms for reheating purposes. During hot weather, heated air is allowed to escape from top of upper plenum, which in turn draws warm air out of lower plenum into upper plenum, thereby allowing cooler outside air to be drawn into lower plenum. By such cooling, the attic space immediately above the ceiling of the rooms of the dwelling is maintained at temperatures close to ambient.

4 Claims, 8 Drawing Figures

SOLAR HEATED AND COOLED DWELLING

BACKGROUND

1. Field

This invention relates to solar heating and cooling of dwellings. More particularly, it relates to direct heating or cooling of air in a dwelling by solar energy means.

2. Prior Art

Numerous solar energy systems for dwellings have been developed in the prior art. However, most of these systems offer little economic value because of high initial cost, high maintenance cost, and a short life cycle.

The following patents are cited to show previous inventions relating to the present invention: U.S. Pat. Nos. 831,411, 2,601,905, 2,680,565, 3,902,474, and 3,994,276.

SUMMARY

A novel and practical solar energy system for heating and cooling a dwelling has now been developed comprising one or more rooms having a ceiling thereover; an attic immediately above the ceiling; a partition dividing the attic into two plenums or chambers connected to one another through an aperture in the partition; wherein the first of the two plenums is enclosed or defined by the attic partition and part of the attic roof; wherein the second plenum is defined or enclosed by the dwelling ceiling, the attic partition, and that part of the attic roof which does not cover the first plenum; wherein the first plenum include a solar energy-transmitting roof and solar energy-absorption means within the plenum (e.g., black-painted inner surfaces) to generate hot air therein; closable attic vent means for each plenum, wherein the attic vent means for the first plenum is located in the upper part thereof; wherein the partition aperture in the attic partition is located in the lower part of the first plenum; first conduit means connecting the first plenum to the rooms of the dwelling to cycle air therebetween and second conduit means connecting the rooms and the second plenum to cycle air therebetween.

During the heating season, the attic vents are closed, and hot air travels into the rooms through the first conduit means from the first attic plenum, i.e., the solar energy-absorption plenum, while cooler air returns to the first plenum for reheating purposes via the second conduit means and the aperture in the attic partition.

In hot weather, the two conduits for conveying air between the attic and the rooms may be closed, and the attic vents opened, whereby hot air generated in the solar energy absorption plenum passes rapidly to the outside, causing air in the second plenum to be continuously pulled into the solar energy-absorption plenum through the aperture between plenums, which in turn causes outside air to be continuously drawn into the second attic plenum through its attic vents, so as to cool the second plenum.

It is, therefore, an object of the present invention to provide an affordable, low maintenance, long life solar energy system for dwellings.

Another object is to provide such a system which is especially suitable for rural housing.

Other objects and advantages will be obvious from the following more detailed description of the invention.

DETAILED DESCRIPTION

Figure 1:
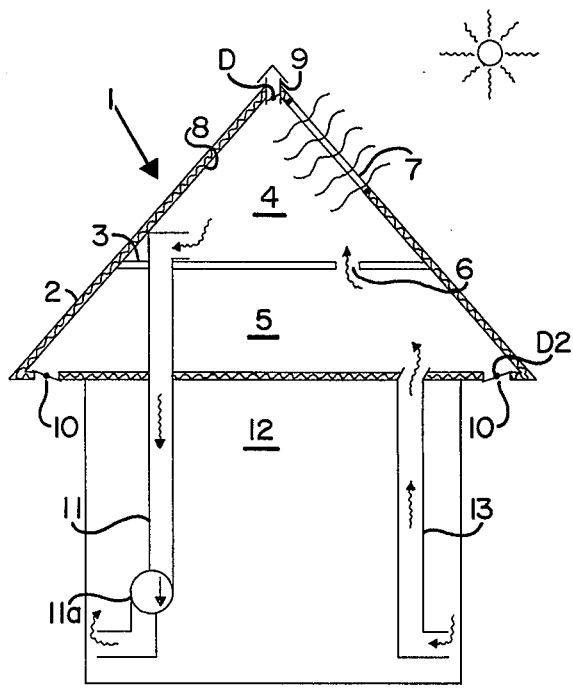
FIG. 1 illustrates the basic dwelling of the present invention.

Referring to FIG. 1, reference numeral 1 designates a dwelling such as a house having a roof 2. The attic of the house is divided by means of a horizontal partition or dividing wall 3 into upper and lower attic plenums 4 and 5, wherein plenum 4 is disposed entirely above plenum 5. An aperture 6 allows air to pass between plenums. Conventional roofing materials are utilized to construct roof 2, except for panel 7 which may extend the entire width of that portion of the roof which covers upper plenum 4. This panel, which should be composed of materials which readily transmit solar energy, such as glass or clear plastic, is disposed in a southerly direction, and preferably is maintained at the proper angle to capture optimum amounts of solar energy (e.g., latitude plus 15°) during the winter months.

Solar energy-absorbing materials, such as flat black-painted plywood, pegboard, hardboard, fiber board, corrugated metal are used to construct the upper face of horizontal partition 3; and black cloth or plastic materials are used for the inside surface 8 of roof 2 which is opposite panel 7.

Full insulation preferably is applied to the attic roof (except for panel 7), and to the ceiling below the lower plenum. Adjustable vents 9 and 10, which include dampers or valve means D and D2, respectively, are positioned at the apex and soffit of the roof, respectively.

Duct means 11, which includes a fan 11a, conveys heated air from the upper attic plenum 4 to room 12 of the house. Conduit 13 extending through the ceiling of room 12 conveys air from the room into lower attic plenum 5, and such air travels through aperture 6 into upper plenum 4.

During the heating season, vents 9 and 10 are fully closed, air in upper plenum 4 is heated by the sun; and duct 11 (which includes fan 11a) draws such air into room 12, while cooler air returns to the upper plenum through conduit 13 and aperture 6 to be reheated.

Figure 2:
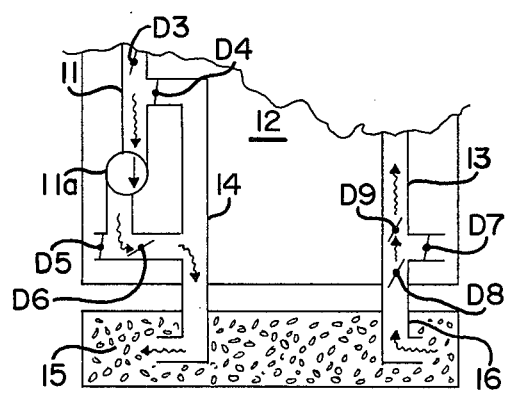
FIGS. 2 and 2A show a modification of FIG. 1 in which a heat sink is located below the dwelling.
Figure 2A:
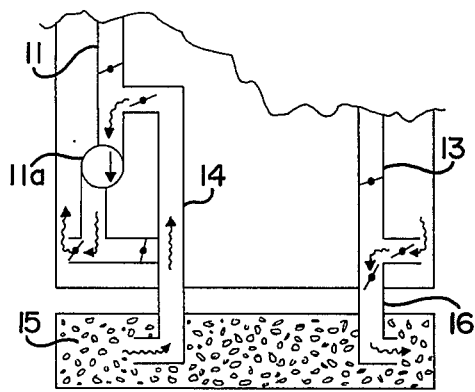

An additional heating expedient is illustrated in FIGS. 2 and 2a, wherein an appropriately valved auxiliary conduit means 14 interconnects a heat sink 15 with both the entrance (upstream) and exit (downstream) sides of fan 11a. As shown in FIG. 2, by appropriate adjustment of dampers or valve means D3 through D9, excess hot air from the attic may be conveyed by conduit 14 to the heat sink 15 composed of, for example, a bed of loose rock located beneath the house. Cool return air from the heat sink is conveyed by auxiliary conduit 16 and conduit 13 back to the attic. Later, when it is necessary to extract heat from the sink, e.g., at night, valves or dampers D3 through D9 are opened or closed in conduits 11, 13, 14, and 16 to provide the flow pattern in FIG. 2a wherein hot air from the heat sink is drawn into the room by fan 11a, while cool air leaves the room and travels through conduit 16 back to the sink for reheating.

Figure 3:
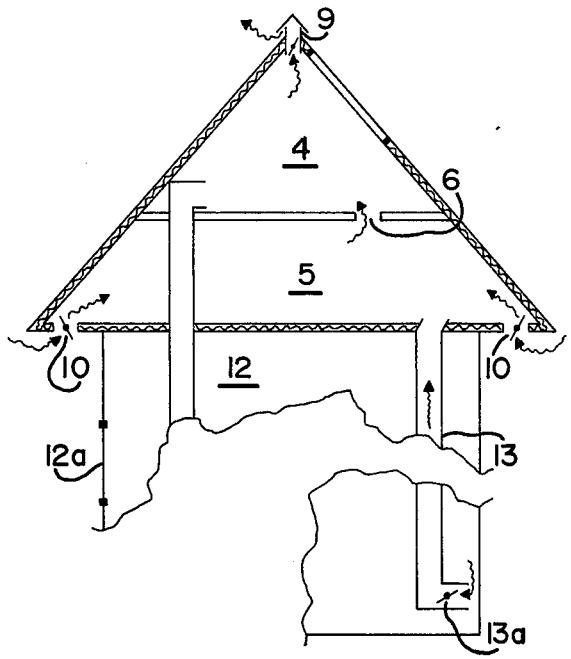
FIGS. 3 and 3A illustrate how the dwelling of FIG. 1 operates during hot weather.

Referring now to FIG. 3, therein is shown the means by which the system of the present invention provides cooling during hot weather. Vents 9 and 10 are opened; and hot air generated in upper plenum 4 rapidly rises through vent 9 to the outside, causing air in lower plenum 5 to be continuously drawn into the upper plenum through aperture 6, which in turn causes outside air to be continuously pulled into plenum 5 through vents 10. To accomplish adequate cooling of the attic space in the lower plenum, vents 9 and 10 preferably should each have an effective opening of at least about 17% of the area of panel 7; and the area ratio between vents 9 and 10 preferably should be about 3:2 to 1:1.

Figure 3A:
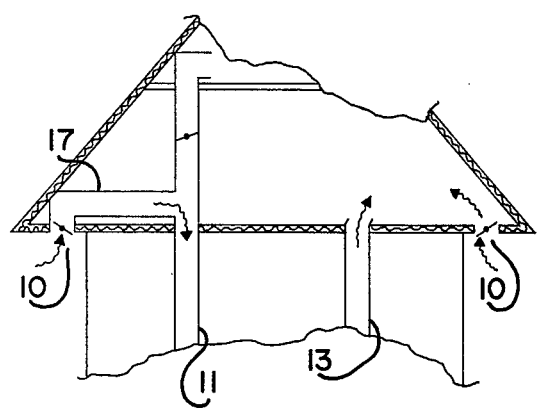

Additionally, as shown in FIG. 3, during hot weather, valve 13a in conduit 13 may be opened thereby drawing air from room 12 upwardly through conduit 13 to the attic, which in turn will cause air to be drawn into the room through an open window 12a. Alternatively, as illustrated in FIG. 3a, an auxiliary conduit 17 can be employed to link up one of the vents 10 with duct means 11, to permit outside air (especially nighttime air) to be drawn into the house through the central ducting system, as air is exhausted from the house through conduit 13, aperture 6 and vent 9. In this manner, cool outside air may be utilized to lower the temperature of heat sink 16 in the same flow pattern as FIG. 2, after which the cooled sink can be utilized to cool the house in the same manner that the sink is used to heat the house in FIG. 2a.

Although not shown in the drawings, conventional heating, cooling, humidifying, and/or dehumidifying devices can be disposed within duct means 11, as an auxiliary heating, cooling, humidifying, or dehumidifying system, respectively.

All motorized valves, dampers, vents of the present invention may be controlled from a central control point, automatically, by prior art devices. In this manner, direct room heating (FIG. 1) may, for example, be automatically switched to heating from the heat sink (FIG. 2a) or cooling of the lower plenum during a hot day (FIG. 3). In the case of automatic control, temperature sensors located inside and outside the house in attic plenum 4, and heat sink 15 will obviously be necessary.

Conventional wood frame and/or masonary construction materials may be employed throughout the dwelling of the present invention, except for the panel means on the south slope of the roof. Such panel means may be composed of one or two overlaying panels of polyvinyl fluoride film-coated, corrugated fiber glass, glass, or other durable light transmitting material.

Figure 4:
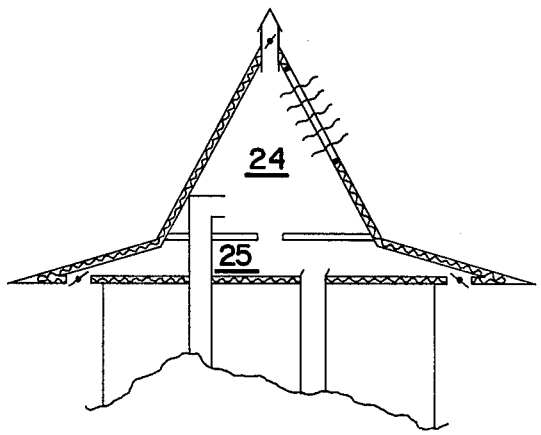
FIGS. 4-6 show modified roof designs of the dwelling of FIG. 1.

A preferred embodiment of the roof design is illustrated in FIG. 4. Therein, only that part of the roof which covers energy-absorbing attic plenum 24 is constructed at the optimum solar heating angle (e.g., latitude plus 15°). The remainder of the roof, i.e., the section which covers lower attic plenum 25, is disposed at a more conventional roof angle, e.g., about 14° to 23°. As a result, the overall volume of the attic is reduced in size; and less materials of construction are required. In tests conducted on a house having an attic design as illustrated in FIG. 4, it was shown that during summer days the lower attic plenum could be maintained at temperatures of only 4° or 5° F., above the outside (ambient) temperature, as a result of the flow pattern shown in FIG. 3, during a period when many conventional attics reached 40° F., above outside (ambient) temperature with standard venting.

Figure 5:
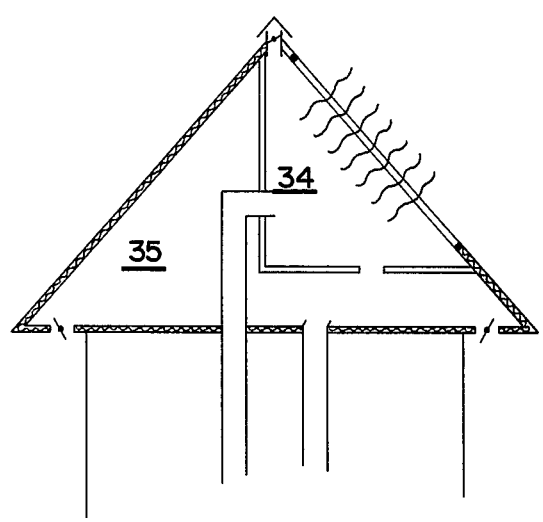

An alternate design of the attic is illustrated in FIG. 5, wherein the energy-absorbing attic plenum 34 is disposed generally alongside, rather than above the other attic plenum 35.

Figure 6:
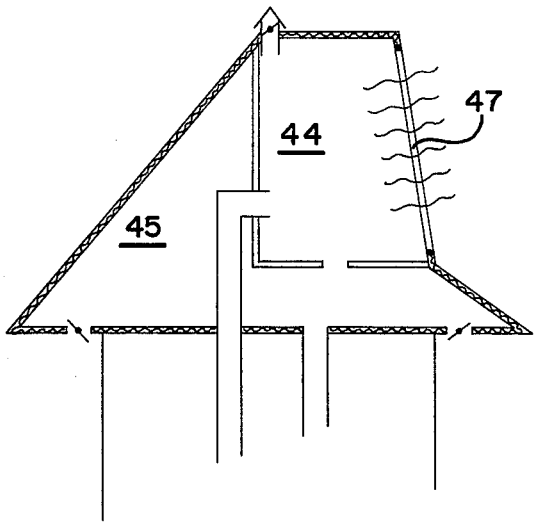

In a further alternate design illustrated in FIG. 6, the energy absorbing attic plenum 44 is disposed alongside the other plenum 45, in the manner of FIG. 5, except only a small part of the roof, i.e., the translucent panel 47, is disposed at the optimum heating angle.

Having thus described my invention, what I claim is as follows:

1. A solar heated and cooled dwelling comprising:
   (a) a ceiling;
   (b) one or more rooms below said ceiling;
   (c) an attic roof above said ceiling defining an attic enclosed by said roof and ceiling;
   (d) a partition in said attic dividing the attic into first and second attic plenums; wherein said first plenum is enclosed by said partition and by part of said attic roof; wherein said second plenum is enclosed by said ceiling, said partition, and by that part of said attic roof not enclosing said first plenum; wherein said partition has an aperture therein to permit air to flow between said first and second plenums, said aperture being disposed in the lower part of said first plenum; wherein a part of said attic roof which partially encloses said first plenum is composed of material that readily transmits solar energy into said first plenum;
   (e) solar energy-absorption means disposed within said first plenum to generate hot air therein;
   (f) first attic vent means in the upper part of said first plenum;
   (g) second attic vent means in said second plenum;
   (h) means to close said first vent means;
   (i) means to close said second vent means;
   (j) first conduit means between said first plenum and said rooms to convey heated air from said first plenum to said rooms;
   (k) second conduit means between said rooms and said second plenum to convey air from said rooms to said second plenum;
   (l) means to close said first conduit means; and
   (m) means to close said second conduit means.

2. The dwelling of claim 1 wherein said partition is a horizontal dividing wall; wherein said first plenum is disposed entirely above said second plenum; wherein said part of said attic roof which partially defines said first plenum has a south slope disposed at an angle of about latitude plus 15°; wherein said part of said attic roof which partially defines said second plenum is disposed at a substantially lower angle than said south slope angle.

3. The dwelling of claim 1 further including a heat sink disposed below said rooms; fan means disposed within said first conduit means; third conduit means connecting said heat sink with said first conduit means at both the upstream and downstream side of said fan means; fourth conduit means connecting said heat sink with said second conduit means; a plurality of valve means disposed within said first, second, third, and fourth means, wherein said valve means may be adjusted to provide the flow of air from said attic to said heat sink, through said heat sink and back to said attic, or, alternatively, from said heat sink to said rooms, through said rooms and back to said heat sink.

4. The dwelling of claim 2 further including a heat sink disposed below said rooms; fan means disposed within said first conduit means; third conduit means connecting said heat sink with said first conduit means at both the upstream and downstream side of said fan means; fourth conduit means connecting said heat sink with said second conduit means; a plurality of valve means disposed within said first, second, third, and fourth conduit means, wherein said valve means may be adjusted to provide the flow of air from said attic to said heat sink, through said heat sink and back to said attic, or, alternatively, from said heat sink to said rooms, through said rooms and back to said heat sink.

* * * * *